US009159963B2

(12) United States Patent
Kang

(10) Patent No.: US 9,159,963 B2
(45) Date of Patent: Oct. 13, 2015

(54) SECONDARY BATTERY HAVING FIRST AND SECOND NON-COATED PORTIONS

(75) Inventor: Jun-Won Kang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 268 days.

(21) Appl. No.: 13/475,216

(22) Filed: May 18, 2012

(65) Prior Publication Data

US 2012/0321941 A1    Dec. 20, 2012

(30) Foreign Application Priority Data

Jun. 16, 2011  (KR) .................. 10-2011-0058507

(51) Int. Cl.
| | |
|---|---|
| H01M 2/06 | (2006.01) |
| H01M 4/02 | (2006.01) |
| H01M 2/02 | (2006.01) |
| H01M 2/26 | (2006.01) |
| H01M 2/30 | (2006.01) |
| H01M 10/04 | (2006.01) |
| H01M 10/052 | (2010.01) |

(52) U.S. Cl.
CPC .............. *H01M 2/0212* (2013.01); *H01M 2/06* (2013.01); *H01M 2/263* (2013.01); *H01M 2/30* (2013.01); *H01M 10/049* (2013.01); *H01M 10/0431* (2013.01); *H01M 10/052* (2013.01)

(58) Field of Classification Search
CPC ........... H01M 2/02; H01M 2/06; H01M 4/02; H01M 2/0212; H01M 2/263; H01M 2/30; H01M 10/0431; H01M 10/049
USPC .................... 429/179, 246, 144, 82, 211, 127
See application file for complete search history.

(56) References Cited

U.S. PATENT DOCUMENTS

| | | | |
|---|---|---|---|
| 6,444,357 B1* | 9/2002 | Kambe et al. ................. | 429/149 |
| 2007/0092792 A1 | 4/2007 | Kasahara et al. | |
| 2008/0026293 A1* | 1/2008 | Marple et al. ............ | 429/231.95 |
| 2009/0155544 A1 | 6/2009 | Nakamura et al. | |

(Continued)

FOREIGN PATENT DOCUMENTS

| | | | | |
|---|---|---|---|---|
| JP | 2005-071788 A | | 3/2005 | |
| JP | 2006139919 A | * | 6/2006 | .............. H01M 4/02 |

(Continued)

OTHER PUBLICATIONS

Machine Translation of: JP 2010/020974 A, Yoneda, Jan. 28, 2010.*

(Continued)

*Primary Examiner* — Kenneth Douyette
(74) *Attorney, Agent, or Firm* — Knobbe Martens Olson & Bear LLP

(57) ABSTRACT

A stacked-type electrode assembly is disclosed. In one embodiment, the electrode assembly includes at least one first electrode plate including i) a first active material coating portion formed on a first base material and coated with a first active material and ii) a first non-coated portion, wherein the first electrode plate has a first width and a first length greater than the first width, and wherein the first electrode plate has upper and lower portions formed in the direction of the first length. The assembly also includes at least one second electrode plate including i) a second active material coated portion formed on a second base material and coated with a second active material and ii) a second non-coated portion, wherein the second electrode plate has a second width and a second length greater than the second width.

20 Claims, 5 Drawing Sheets

(56) References Cited

U.S. PATENT DOCUMENTS

| | | |
|---|---|---|
| 2011/0039138 A1* | 2/2011 | Jeong et al. .................... 429/94 |
| 2011/0129722 A1 | 6/2011 | Yoneda |
| 2011/0135998 A1 | 6/2011 | Ahn |

FOREIGN PATENT DOCUMENTS

| | | | | |
|---|---|---|---|---|
| JP | 2009-145504 A | | 7/2009 | |
| JP | 2009-266559 A | | 11/2009 | |
| JP | 2010020974 A | * | 1/2010 | ............ H01M 10/04 |
| JP | 4532448 B2 | | 6/2010 | |
| JP | 4659861 B2 | | 1/2011 | |
| KR | 10-2011-0065341 A | | 6/2011 | |

OTHER PUBLICATIONS

Machine Translation of: JP 2006/139919 A, Sano et al., Jun. 1, 2006.*

Korean Notice of Allowance dated Dec. 10, 2013 for Korean Patent Application No. KR 10-2011-0058507 which corresponds to captioned U.S. Appl. No. 13/475,216.

Korean Office Action dated Feb. 28, 2013 for Korean Patent Application No. KR 10-2011-0058507 which corresponds to captioned U.S. Appl. No. 13/475,216.

* cited by examiner

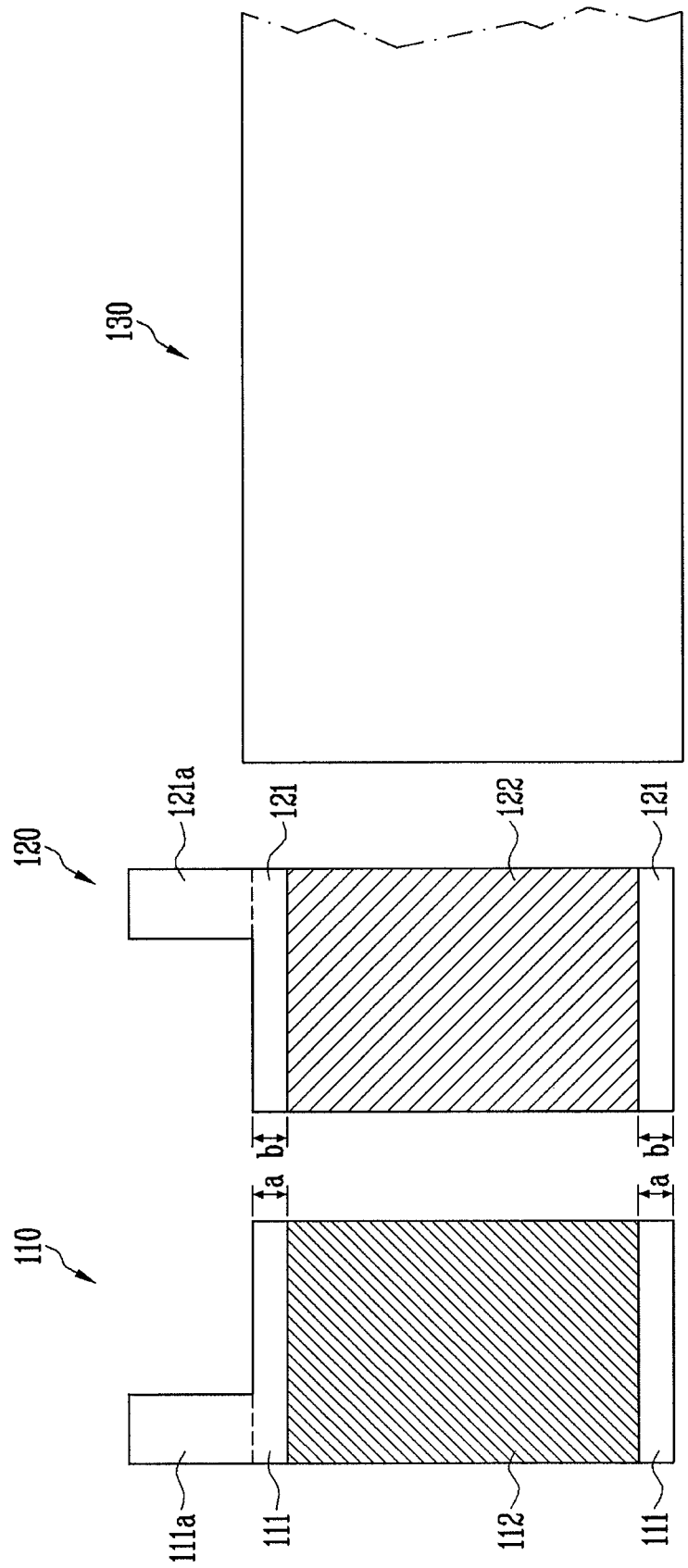

SECONDARY BATTERY HAVING FIRST AND SECOND NON-COATED PORTIONS

RELATED APPLICATIONS

This application claims priority to and the benefit of Korean Patent Application No. 10-2011-0058507, filed on Jun. 16, 2011, in the Korean Intellectual Property Office, the entire content of which is incorporated herein by reference.

BACKGROUND

1. Field

The described technology generally relates to a secondary battery, and more particularly, to a secondary battery having improved safety.

2. Description of the Related Technology

Batteries widely used as power sources of portable devices may be divided into secondary batteries and primary batteries. Unlike the primary batteries of which charge is impossible, the secondary batteries are rechargeable, and thus, they can be used multiple times. The shapes of the secondary batteries may be easily adapted to those of external electronic devices that employ the secondary batteries. As described above, since the secondary batteries can effectively accumulate energy for relatively smaller volumes and masses, they are frequently used as power sources of portable electronic devices.

In particular, with the development of portable communication devices, demands on secondary batteries used for the portable communication devices are increased. Since a problem of safety may occur due to characteristics of the secondary batteries, studies have been conducted in many fields so as to prevent the problem of safety.

SUMMARY

One inventive aspect is a secondary battery capable of prevent overcurrent caused by a high temperature or degradation of the secondary battery.

Another aspect is a stacked-type electrode assembly, including: at least one first electrode plate having a first active material coating portion formed by coating a first active material on a base material and a first non-coating portion on which the first active material is not coated; at least one second electrode plate having a second active material coating portion formed by coating a second active material on a base material and a second non-coating portion on which the second active material is not coated; and at least one separator interposed between the first and second electrode plates, wherein the first or second non-coating portion is formed on at least one of upper and lower portions in the length direction of the first or second electrode plate, and the first and second electrode plates are provided so that at least portions of the first and second non-coating portions correspond to each other.

The length of the first non-coating portion may be provided longer than that of the second non-coating portion.

The first and second electrode plates may include positive and negative electrode plates, respectively.

The first and second active material coating portions may include positive and negative electrode active material coating portions, respectively, and the area of the negative electrode active material coating portion may be provided larger than that of the positive electrode active material coating portion.

The positive and negative electrode plates may be provided to have the same area.

The first or second non-coating portion may be extended from the first or second active material coating portion in the length direction of the first or second electrode plates, and have the same width as the first or second active material coating portion.

The first or second non-coating portion may be extended by 2 to 3 mm from the first or second active material coating portion in the length direction of the first or second electrode plates.

The first or second non-coating portion may be provided at both the upper and lower portions in the length direction of the first or second electrode plate, and a first or second tab portion extended from the first or second non-coating portion may be provided to at least one of the upper and lower portions of the first or second non-coating portion.

The same kind of the first and second tab portions may be opposite to each other, and the first and second tab portions may be stacked so as not to come in contact with each other.

The first and second tab portions may be stacked to be extracted in the same direction from the electrode assembly.

The first and second tab portions may be provided by punching the first and second non-coating portions using a mold, respectively.

Another aspect is a secondary battery including: a stacked-type electrode assembly including at least first electrode plate having a first active material coating portion formed by coating a first active material on a base material and a first non-coating portion on which the first active material is not coated, at least one second electrode plate having a second active material coating portion formed by coating a second active material on a base material and a second non-coating portion on which the second active material is not coated, and at least separator interposed between the first and second electrode plates; a battery case that accommodates the electrode assembly; and first and second electrode leads provided to the electrode assembly and extended to the outside of the battery case, wherein the first or second non-coating portion is formed on at least one of upper and lower portions in the length direction of the first or second electrode plate, and the first and second electrode plates are provided so that at least portions of the first and second non-coating portions correspond to each other.

First or second tab portions may be electrically connected by a clamping or C-shaped clip, and the clamping or C-shaped clip may be connected to first or second electrode lead. Another aspect is a stacked-type electrode assembly comprising: at least one first electrode plate comprising i) a first active material coating portion which is formed on a first base material and coated with a first active material and ii) a first non-coated portion, wherein the first electrode plate has a first width and a first length which is greater than the first width, and wherein the first electrode plate has upper and lower portions formed in the direction of the first length; at least one second electrode plate comprising i) a second active material coated portion which is formed on a second base material and coated with a second active material and ii) a second non-coated portion, wherein the second electrode plate has a second width and a second length which is greater than the second width, and wherein the second electrode plate has upper and lower portions formed in the direction of the second length; and at least one separator interposed between the first and second electrode plates, wherein the first non-coated portion is formed on at least one of the upper and lower portions of the first electrode plate, wherein the second non-coated portion is formed on at least one of the upper and lower portions of the second electrode plate, and wherein at least portions of the first and second non-coated portions correspond to each other.

In the above electrode assembly, first non-coated portion is longer than the second non-coated portion. In the above electrode assembly, the first and second electrode plates are positive and negative electrode plates, respectively. In the above electrode assembly, the first and second active material coated portions are positive and negative electrode active material coated portions, respectively, and wherein the area of the negative electrode active material coated portion is greater than that of the positive electrode active material coated portion.

In the above electrode assembly, the areas of the positive and negative electrode plates are substantially the same. In the above electrode assembly, the first or second non-coated portion extends from the first or second active material coated portion in the first or second length direction, and has substantially the same width as the first or second active material coated portion. In the above electrode assembly, the length of the first or second non-coated portion defined in the first or second length direction is from about 2 mm to about 3 mm. In the above electrode assembly, the first or second non-coated portion is formed at both the upper and lower portions of the first or second electrode plate.

The above electrode assembly further comprises i) a first tab portion extending from the first non-coated portion and ii) a second tab portion extending from the second non-coated portion. In the above electrode assembly, the first tab portion comprises a plurality of first sub-tab portions which have the same polarity and are stacked to be substantially aligned with each other, wherein the second tab portion comprises a plurality of second sub-tab portions which have the same polarity and are stacked to be substantially aligned with each other, and wherein the polarity of the first sub-tab portions is different from that of the second sub-tab portions.

In the above electrode assembly, the first sub-tab portions do not contact the second sub-tab portions. In the above electrode assembly, the first and second tab portions extend in the same direction from the electrode assembly. In the above electrode assembly, the first and second tab portions are integrally formed with the first and second non-coated portions, respectively. In the above electrode assembly, the first and second non-coated portions at least partially overlap with each other in a direction substantially perpendicular to i) one of the first and second length directions and ii) one of the first and second width directions. In the above electrode assembly, at least part of the first non-coated portion is formed substantially directly above or below at least part of the second non-coated portion.

Another aspect is a secondary battery comprising: a stacked-type electrode assembly comprising: at least one first electrode plate comprising i) a first active material coated portion which is formed on a first base material and coated with a first active material and ii) a first non-coated portion, wherein the first electrode plate has a first width and a first length which is greater than the first width, and wherein the first electrode plate has upper and lower portions formed in the direction of the first length; at least one second electrode plate comprising i) a second active material coated portion which is formed on a second base material and coated with a second active material and ii) a second non-coated portion, wherein the second electrode plate has a second width and a second length which is greater than the second width, and wherein the second electrode plate has upper and lower portions formed in the direction of the second length; and at least one separator interposed between the first and second electrode plates; a battery case that accommodates the electrode assembly; and first and second electrode leads electrically connected to the electrode assembly and at least partially exposed from the battery case, wherein the first non-coated portion is formed on at least one of the upper and lower portions of the first electrode plate, wherein the second non-coated portion is formed on at least one of the upper and lower portions of the second electrode plate, and wherein at least portions of the first and second non-coated portions correspond to each other.

In the above battery, the at least one first electrode plate comprises a plurality of first electrode plates, wherein the at least one second electrode plate comprises a plurality of second electrode plates, wherein the secondary battery further comprises i) a plurality of first tab portions each of which extends from the first non-coated portions and ii) a second plurality of tab portions each of which extends from the second non-coated portions, and wherein the first tab portions or the second tab portions are electrically connected to each other via a clamping or C-shaped clip. In the above battery, at least part of the first non-coated portion is formed substantially directly above or below at least part of the second non-coated portion.

Another aspect is a stacked-type electrode assembly comprising: at least one first electrode plate comprising a first coated portion coated with a first active material and a first non-coated portion extending from at least one side of the first coated portion; at least one second electrode plate comprising a second coated portion coated with a second active material which is different from the first active material and a second non-coated portion extending from at least one side of the second coated portion, wherein the first and second non-coated portions are at least partially aligned with each other in a direction which substantially vertically crosses the first and second electrode plates; and at least one separator interposed between the respective first and second electrode plates.

In the above electrode assembly, the first electrode plate has a first width and a first length which is greater than the first width, and wherein the first electrode plate has upper and lower portions formed in the direction of the first length, wherein the second electrode plate has a second width and a second length which is greater than the second width, and wherein the second electrode plate has upper and lower portions formed in the direction of the second length, wherein the first non-coated portion is formed on at least one of the upper and lower portions of the first electrode plate, and wherein the second non-coated portion is formed on at least one of the upper and lower portions of the second electrode plate, and wherein the length of the first or second non-coated portion defined in the first or second length direction is from about 2 mm to about 3 mm.

BRIEF DESCRIPTION OF THE DRAWINGS

FIG. 2A is a perspective view a first electrode plate, a second electrode plate and a separator, which constitute an electrode assembly of FIG. 1.

DETAILED DESCRIPTION

Figure 1:
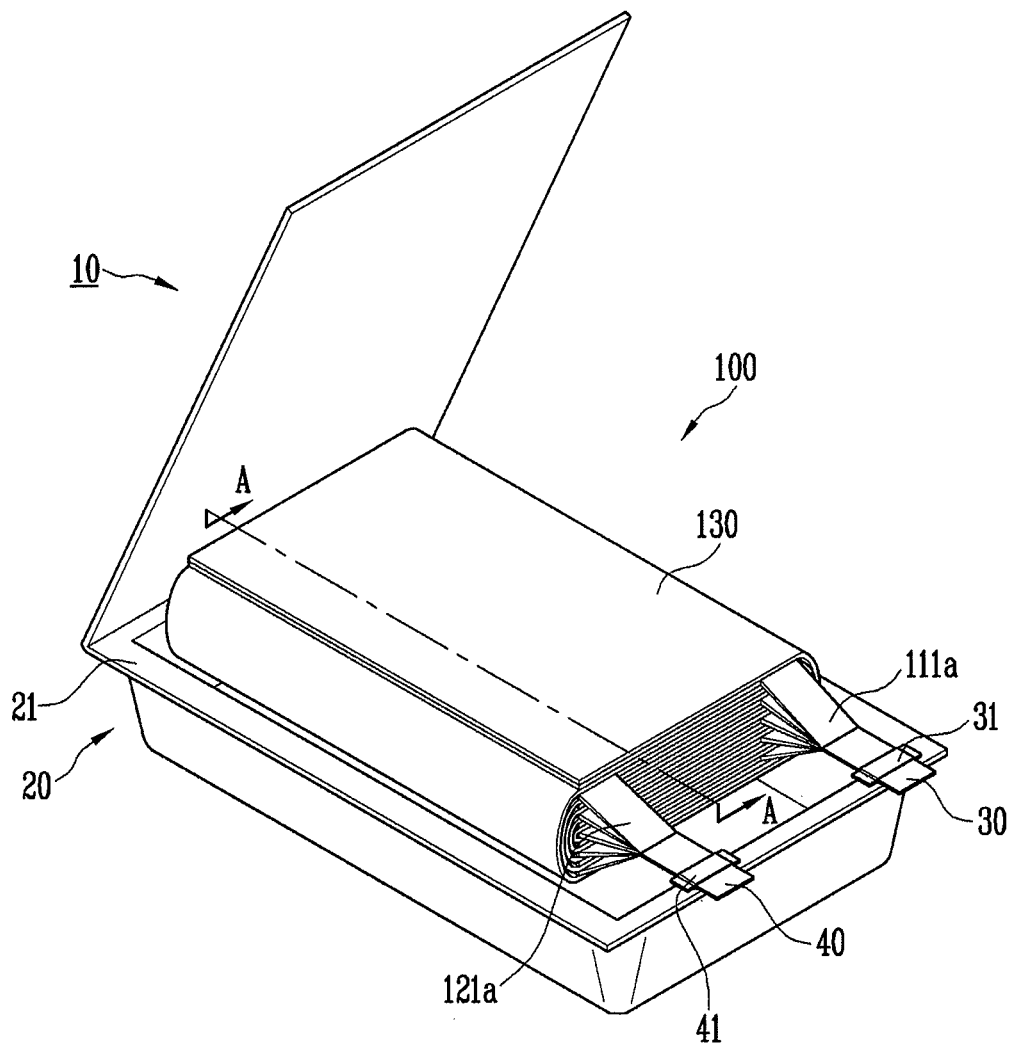
FIG. 1 is an exploded perspective view of a secondary battery according to an embodiment.

In the following detailed description, only certain embodiments have been shown and described, simply by way of illustration. As those skilled in the art would realize, the described embodiments may be modified in various different ways. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments will be described with reference to the accompanying drawings.

Figure 2B:
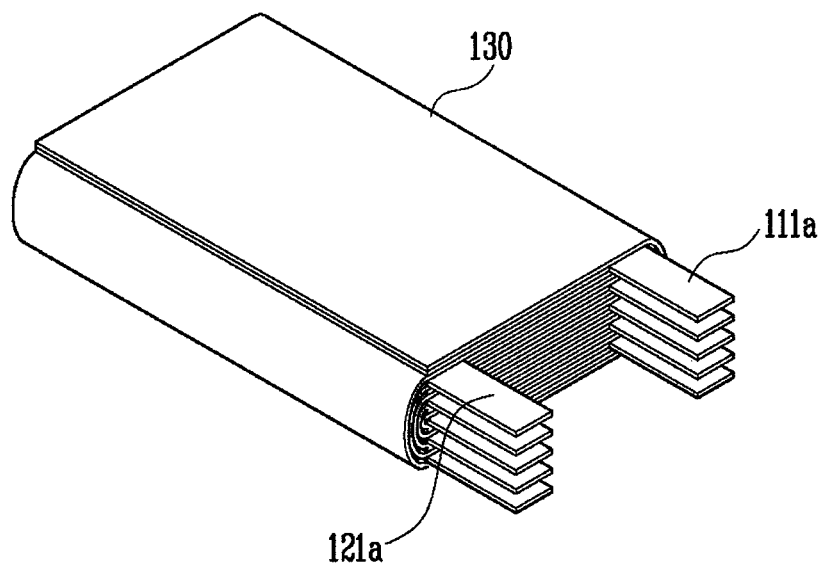
FIG. 2B is a perspective view of the electrode assembly of FIG. 1.

FIG. 1 is an exploded perspective view of a secondary battery 10 according to an embodiment. FIG. 2A is a perspective view the first electrode plate, the second electrode plate and the separator, which constitute the electrode assembly of FIG. 1. FIG. 2B is a perspective view of the electrode assembly of FIG. 1.

Figure 2C:
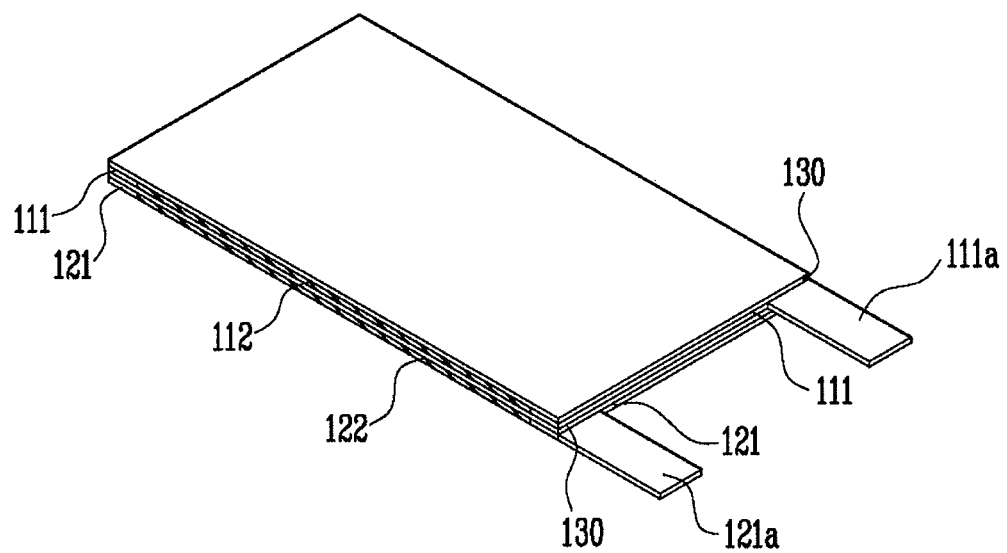
FIG. 2C is a perspective view of the electrode assembly of FIG. 1 which shows the positional relationship between first and second non-coating portions.

The secondary battery 10 includes a stacked-type electrode assembly 100. The stacked-type electrode assembly 100 includes a first electrode plate 110, a second electrode plate 120 and a separator 130 interposed between the first and second electrode plates 110 and 120 (see FIG. 2A). The first electrode plate 110 includes a first active material coating (or coated) portion 112 which is formed on a base material and coated with a first active material and a first non-coating (or non-coated) portion 111 which is formed on the base material and not coated with the first active material on the base material. The second electrode plate 120 includes a second active material coating (or coated) portion 122 which is formed on a base material and coated with a second active material and a second non-coating (or non-coated) portion 121 which is formed on the base material and not coated with the second active material. In one embodiment, as shown in FIG. 2A, the first or second non-coating portion 111 or 121 is formed on at least one of upper or lower portions in the length direction of the first or second electrode plate 110 or 120. In this embodiment, at least portions of the first and second non-coating portions 111 and 121 correspond to each other. For example, as shown in FIG. 2C, the two non-coating portions 111 and 121 may at least partially overlap with each other in a direction substantially perpendicular to the length and width directions of one of the first and second electrode plates 110 and 120 (or direction substantially vertically crossing the first and second electrode plates 110 and 120, and the separator 130. Furthermore, as shown in FIG. 2C, at least part of the first non-coating portion 111 is formed substantially directly above or below at least part of the second non-coating portion 121. This may apply to the remaining embodiments.

In one embodiment, as shown in FIG. 1, the stacked-type secondary battery 10 further includes a battery case 20 that accommodates the electrode assembly 100. Although a pouch may be used as an example of the battery case 20, this is not considered limiting. The secondary battery 10 may be manufactured by accommodating the electrode assembly 100 together with an electrolyte (not shown) in the battery case 20.

The battery case 20 includes a main body that accommodates the electrode assembly 100 and a cover that covers the main body. A sealing portion 21 (FIG. 1) may be provided at an edge of the main body. The stacked-type secondary battery 10 may be manufactured by accommodating the electrode assembly 100 and the electrolyte (not shown) in the main body of the battery case 20 and then thermally bonding the sealing portion 21 in the state that the main body and the cover are adhered closely to each other.

In the electrode assembly 100, first and second electrode leads 30 and 40 may be fused to first and second tab portions 111a and 121a, respectively. In one embodiment, the two electrode leads 30 and 40 are provided to protrude to the outside of the battery case 20 through the sealing portion 21 of the battery case 20. Thus, the electrode leads 30 and 40 allow the secondary battery 10 to be electrically connected to the outside of the secondary battery 10. The first and second electrode leads 30 and 40 may further include lead films 31 and 41, respectively. In one embodiment, the lead films 31 and 41 are respectively provided to portions at which the electrode leads 30 and 40 come in contact with the sealing portion 21 of the battery case 20. The lead films 31 and 41 can prevent short circuits between the sealing portion 21 and the first and second electrode leads 30 and 40, which may occur when the sealing portion 21 of the battery case 20 is thermally fused. Simultaneously, the lead films 31 and 41 increase the adhesion of the sealing portion 21, so that it is possible to prevent the electrolyte from being flowed out to the outside of the battery case 20.

The electrolyte (not shown) accommodated in the battery case 20 may include a lithium salt that acts as a supply source of lithium ions, and a non-aqueous organic solvent that serves as a medium through ions participating in an electrochemical reaction can move. The first and second electrode plates 110 and 120 that constitute the electrode assembly 100 can generate electrochemical energy by reacting to the electrolyte, and the electrochemical energy can be transferred to the outside of the secondary battery 10 through the electrode leads 30 and 40.

In one embodiment, as shown in FIGS. 1 and 2A, the electrode assembly 100 may be formed by sequentially stacking a plurality of first electrode plates 110 and a plurality of second electrode plates 120 and separators 130 while interposing the separators between the respective first and second electrode plates 110 and 120.

The first electrode plate 110 may be a positive electrode plate. The positive electrode plate may include i) a positive electrode active material coating portion 112 that is a first active material coating portion 112 which is formed on a base material and coated with a positive electrode active material and ii) a first non-coating portion 111 on which the positive electrode active material is not coated. In one embodiment, the base material is a material having high conductivity. The base material is not particularly limited as long as it is one that does not induce a chemical change. The positive electrode active material that constitutes the positive electrode active material coating portion 112 may include a layered compound containing lithium.

The second electrode plate 120 may be a negative electrode plate. The negative electrode plate may include i) a negative electrode active material coating portion 122 that is, for example, a second active material coating portion 122, and ii) a second non-coating portion 121. The base material may be a conductive material, and graphite or the like may be used as the negative electrode active material provided to the negative electrode active material coating portion 122. Hereinafter, for convenience of illustration, the first and second electrode plates 110 and 120 are referred to as positive and negative electrode plates, respectively. However, this is not considered limiting. For example, the first and second electrode plates 110 and 120 may be negative and positive electrode plates, respectively.

The first and second non-coating portions 111 and 121 may be extended from the positive and negative active material coating portions 112 and 122.

The positive and negative electrode plates 110 and 120 may have the same area. In this instance, the first or second non-coating portion 111 or 121 is extended in the length direction of the positive or negative electrode plate 110 or 120. The first or second non-coating portion 111 or 121 may be extended from the positive or negative electrode active material coating portion 112 or 122 while having a width substantially identical to that of the active material coating portion 112 or 122. The area of the negative electrode active material coating portion 122 may be larger than that of the positive electrode active material coating portion 112. The positive and negative electrode plates 110 and 120 may have the same area regardless whether or not the area of the coating portion 122 is the same as that of the coating portion 112.

The first and second non-coating portion 111 or 121 may be provided at an upper portion, a lower portion or both the upper and lower portions in the length direction of the positive or negative electrode plate 110 or 120. In the first or second non-coating portions 111 or 121, the first or second tab portion 111a or 121a extended from the first or second non-coating portion 111 or 121 may be further formed at one of the upper and lower portions.

The first or second non-coating portion 111 or 121 may be extended in the length direction of the electrode plate 110 or 120 from the active material coating portion 112 or 122 by about 2 mm to about 3 mm. The lengths 'a' and 'b' of the first and second non-coating portions 111 and 121, which are lengths respectively extended from the active material coating portions 112 and 122 may be substantially identical to or different from each other. The lengths 'a' and 'b' of the first and second non-coating portions 111 and 121 may be properly modified according to the design (e.g., known general dimension) of the secondary battery.

The first and second tab portions 111a and 121a may be formed by punching or pressing the first and second non-coating portions 111 and 121 using, for example, a mold or press, respectively. In one embodiment, the first and second tab portions 111a and 121a are formed by punching sides of the non-coating portions 111 and 121 of the electrode plates 110 and 120, respectively. In the above examples, the first and second tab portions 111a and 121a may be integrally formed with the first and second non-coating portions 111 and 121. The first and second tab portions 111a and 121a may have various shapes. In one embodiment, the positive electrode plates 110 and the negative electrode plates 120, respectively stacked by the first and second tab portions 111a and 121a, are provided so that the same kind of electrode plates can be easily connected electrically to one another. However, the positive and negative electrode plates 110 and 120 are not limited to the aforementioned shape and method.

In one embodiment, the first and second tab portions 111a and 121a are exposed from or extend away from the separator 130 so as to allow the electrode assembly 100 to be exposed from or extend outside a case of the secondary battery 10. The first and second tab portions 111a and 121a have polarities opposite to each other and extend away from the separator 130 to extend outside the case of the secondary battery 10. Hence, in a case where the first and second tab portions 111a and 121a come in contact with each other, a short circuit between the first and second tab portions 111a and 121a may occur.

Therefore, the first and second non-coating portions 111 and 121 may be extended to have widths substantially identical to the positive and negative electrode active material coating portions 112 and 122, respectively. The first or second tab portion 111a or 121a may have a width narrower than that of the non-coating portion so that the first and second tab portions do not contact each other.

In one embodiment, as shown in FIG. 2B, the positive and negative electrode plates 110 and 120 are stacked while interposing the separators 130 between the respective positive and negative electrode plates 110 and 120 so as to prevent the positive and negative electrode plates 110 and 120 from being short-circuited due to contacting each other. For example, the separator 130 may be formed of a polymer material, and an insulative thin film having high ion transmittance and mechanical strength may be used as the separator 130.

One side of the separator 130 may have a width substantially identical to that of each of the positive and negative electrode plates 110 and 120, and the other side of the separator 130 may be extended. The stacked-type electrode assembly 100 may be manufactured by winding clockwise or counterclockwise so that the separators 130 are interposed between the respective first and second electrode plates 110 and 120 while alternately stacking the positive and negative electrode plates 110 and 120 cut in an approximately rectangular shape. That is, a positive electrode plate 110 is positioned on a separator 130, and the separator 130 is rolled to surround the positive electrode plate 110. Then, a negative electrode is stacked on the top or bottom of the positive electrode plate 110 surrounded by the separator 130. Subsequently, the separator 130 is rolled to surround the negative electrode plate 120. Thus, the electrode assembly 100 is manufactured by repeating such a procedure. In this instance, the first and second non-coating portions 111 and 121 of the positive and negative electrode plates 110 and 120 are disposed to be substantially perpendicular to the winding direction of the separator 130, and the first and second tab portions 111a and 121a may be exposed from the separator 130.

When the portions at which the first and second non-coating portions 111 and 121 are provided are referred to as upper and lower portions, respectively, only both side portions of the positive and negative electrode plates 110 and 120 except the upper and lower portions are surrounded by the separator 130. Therefore, the first and second tab portions 111a and 121a respectively extended from the first and second non-coating portion 111 and 121 are exposed from the separator 130. The first and second tab portions 111a and 121a having the same kind (e.g., same polarity) are opposite to each other, and may be stacked so as not to contact each other. That is, in the secondary battery 10, the positive and negative electrode plates 110 and 120 may be stacked so that the first and second tab portions 111a and 121a are extracted in the same direction of the electrode assembly 100.

In one embodiment, the separator 130 is formed of a polymer material. In this embodiment, if the secondary battery 10 is exposed at a high temperature, the separator 130 may be contracted. The contracted separator 130 may be contracted so that the positive and negative electrode plates 110 and 120 are exposed. When the positive and negative electrode plates 110 and 120 have substantially the same width, the exposed electrode plates may contact each other. As the secondary battery 10 is used, gas may be generated in the inside of the secondary battery 10 due to the degradation of the secondary battery 10, and the gas may cause the deformation of the electrode assembly 100.

In a case where the positive and negative electrode plates 110 and 120 having opposite polarities come in direct contact with each other, a short circuit may occur between the positive and negative electrode plates 110 and 120. The short circuit resistance between the positive electrode active material coating portion 112 and the second non-coating portion 121 is greater than that between the first and second non-coating portions 111 and 121, and overcurrent is induced in the secondary battery 10. Therefore, the overcurrent may result in firing or explosion of the secondary battery 10.

In one embodiment, both the side portions of the positive and negative electrode plates 110 and 120 are surrounded by the separator 130. In this embodiment, although the separator 130 is contracted, the positive and negative electrode plates 110 and 120 are not exposed to the outside. On the other hand, a problem may occur at the side of the first or second non-coating portion 111 and 121 provided at the upper and lower portions of the positive or negative electrode plate 110 or 120. The first and second non-coating portions 111 and 121 are portions having the respective first and second tab portions 111a and 121a so as to be electrically connected to an external element or device. In one embodiment, the first and second non-coating portions 111 and 121 are exposed from the separator 130. In this embodiment, the upper and lower portions of the positive or negative electrode plate 110 or 120 may have an open shape which allows the first or second tab portion 111a or 121a to be exposed.

As described above, in the electrode assembly 100, portions of the positive and negative electrode plates 110 and 120 may be exposed from the separator 130 due to the contraction of the separator 130. Therefore, a short circuit may occur due to the contact between the electrode plates having different polarities. In a case where the degree of the contraction of the separator 130 is excessive, the positive electrode active material coating portion 112 of the positive electrode plate 110 may be exposed, and the direct contact between the positive electrode active material coating portion 112 and the second non-coating portion 121 may result in the firing or explosion of the secondary battery 10.

Figure 3:
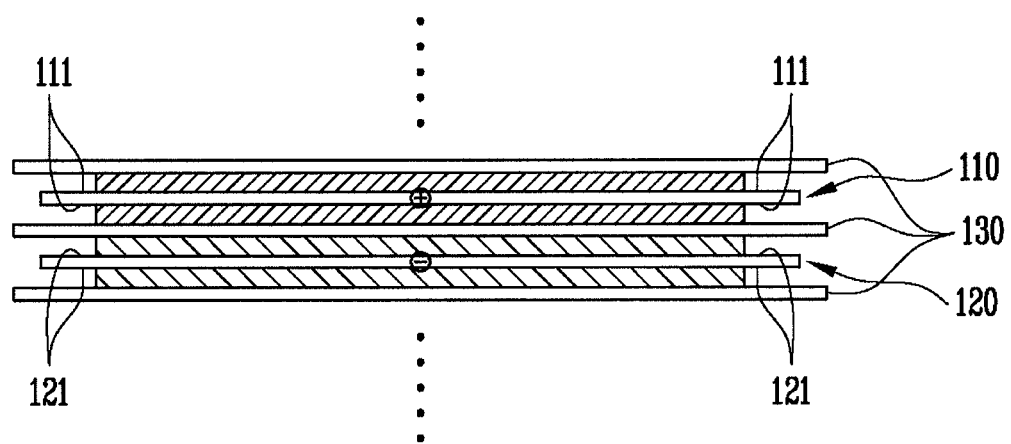
FIG. 3 is a sectional view taken along line A-A of FIG. 1.

FIG. 3 is a sectional view taken along line A-A of FIG. 1.

Referring to FIG. 3, in the electrode assembly 100 manufactured as described above, the first or second non-coating portion 111 or 121 may be provided at the upper and lower portions in the length direction of the positive or negative electrode plate 110 or 120. The positive and negative electrode plates 110 and 120 may be alternately stacked. In this instance, the first or second non-coating portions 111 and 121 may be stacked to face each other with the separator 130 interposed therebetween.

The positive and negative electrode plates 110 and 120 may be stacked so that the first and second non-coating portions 111 and 121 are provided at positions corresponding to each other. In one embodiment, the first non-coating portion 111 is larger than the second non-coating portion 121. In this embodiment, when the separator 130 is contracted, it is possible to improve the safety of the secondary battery 10. Specifically, the contact area between the first and second non-coating portions 111 and 121 is increased, so that the possibility of the contact between the positive electrode active material coating portion 112 and the second non-coating portion 121 can be decreased. That is, the length 'a' of the first non-coating portion 111 extended from the positive electrode active material coating portion 112 may be longer than that 'b' of the second non-coating portion 121 extended from the negative electrode active material coating portion 122. As the length 'a' of the first non-coating portion 111 is lengthened, the direct contact between the positive electrode active material coating portion 112 and the second non-coating portion 121 can be delayed, thereby improving the safety of the secondary battery 10.

In one embodiment, it is possible to prevent the direct contact between the positive and negative electrode active material coating portions 112 and 122. The short circuit between the two coating portions 112 and 122 may cause fire or explosion stronger than that caused by the short circuit between the positive electrode active material coating portion 112 and the non-coating portion 121, and therefore, the safety of the secondary battery 10 may be considerably influenced by the short circuit between the positive and negative electrode active material coating portions 112 and 122. That is, although any one of the upper and lower portions of the positive or negative electrode plate 110 or 120 is exposed due to the contraction of the separator 130, the positive and negative electrode active material coating portions 112 and 122 are not opposite to each other. Thus, the positive and negative electrode active material coating portions 112 and 122 are not short-circuited to each other. Further, the first and second non-coating portions 111 and 121 can induce a short circuit before the positive and negative electrode active material coating portions 112 and 122 are short-circuited, thereby improving the safety of the secondary battery 10.

The first or second non-coating portion 111 or 121 may be extended by about 2 mm to about 3 mm in the length direction of the positive or negative electrode plate 110 or 120 from the positive or negative electrode active material coating portions 112 and 122. The above range may provide an optimum balance between i) the margin of the first or second non-coating portion 111 or 121 with respect to the contraction of the separator 130 and ii) the energy efficiency of the secondary battery 10. For example, the above range may provide a sufficient margin of the first or second non-coating portion 111 or 121 so that even if the separator 130 is contracted, the positive or negative electrode active material coating portion 112 or 122 may not be exposed from the electrode assembly 130, preventing a short circuit therebetween. Furthermore, in the above range, the regions of the positive and negative electrode active material coating portions 112 and 122 may not substantially decrease so that the energy efficiency of the secondary battery 10 may not be substantially reduced. However, depending on the embodiment, the above range may be less than about 2 mm or greater than about 3 mm. Here, the regions of the positive and negative electrode active material coating portions 112 and 122 are regions at which electrochemical energy is generated in the electrode plates. In one embodiment, when considering the safety and energy efficiency of the secondary battery 10, the length 'a' or 'b' of the first and second non-coating portion 111 or 121 extended from the first or second active material coating portion 112 or 122 is about 2 mm to about 3 mm.

The first and second tab portions 111a and 121a can electrically connect the electrode plates stacked together so as to facilitate electrical connection of the electrode plates to the outside. The first and second tab portions 111a and 121a may be connected to the first and second electrode leads 30 and 40, respectively. For example, the first and second tab portions 111a and 121a may be connected to the respective first and second electrode leads 30 and 40 using, for example, at least one of laser welding, ultrasonic welding, resistance welding and punching. The first or second electrode lead 30 or 40 may be formed of a conductor having high electrical conductivity, such as nickel or copper.

In the following embodiments, descriptions of components except the following descriptions are similar to those in FIGS. 1 to 3, and therefore, their detailed descriptions will be omitted.

Figure 4:
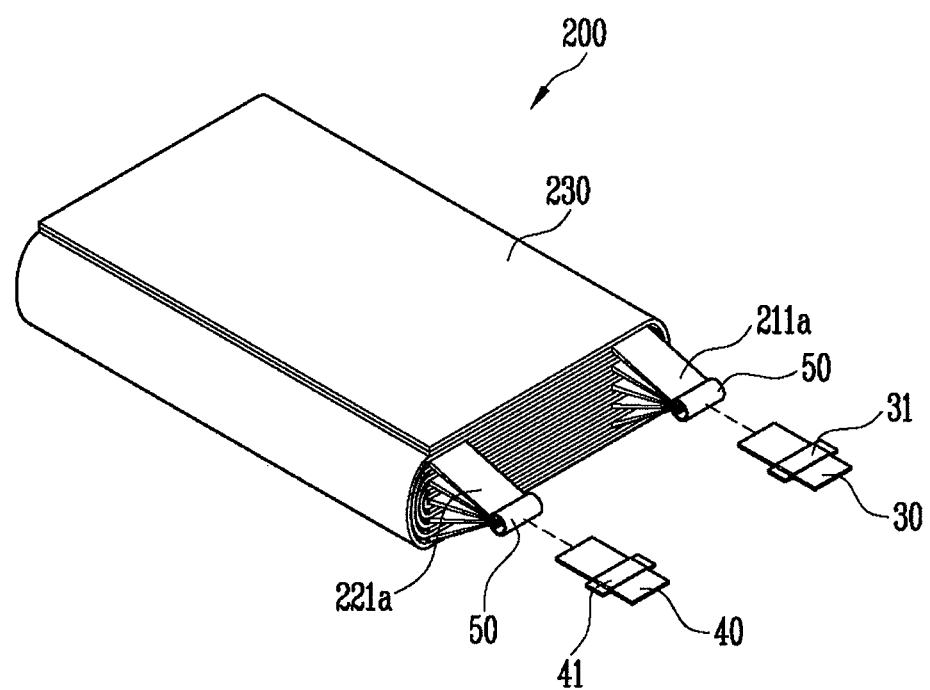
FIG. 4 is a perspective view of an electrode assembly according to another embodiment.

FIG. 4 is a perspective view of an electrode assembly according to another embodiment.

Referring to FIG. 4, the stacked-type electrode assembly 200 includes i) positive electrode plates each having a positive electrode active material coating portion and a first non-coating portion, ii) negative electrode plates each having a negative electrode active material coating portion and a negative electrode non-coating portion and iii) separators 230 interposed between the respective positive and negative electrode plates. In one embodiment, the first or second non-coating portion is formed on at least one of upper and lower portions in the length direction of the positive or negative electrode plate. In this embodiment, at least portions of the first and second non-coating portions correspond to each other.

First and second tab portions 211a and 221a may be provided at sides of the first and second non-coating portions, respectively. In order to electrically connect the stacked positive and negative electrode plates to each other, the first and second tab portions 211a and 221a may be gathered together, for example, by a clamping member, C-shaped clip 50, or the like. In this embodiment, the C-shaped clips 50 are fused to the first and second electrode leads 30 and 40, so that it is possible to facilitate the electrical connection of the electrode assembly 200 to an external electronic device.

Figure 5:
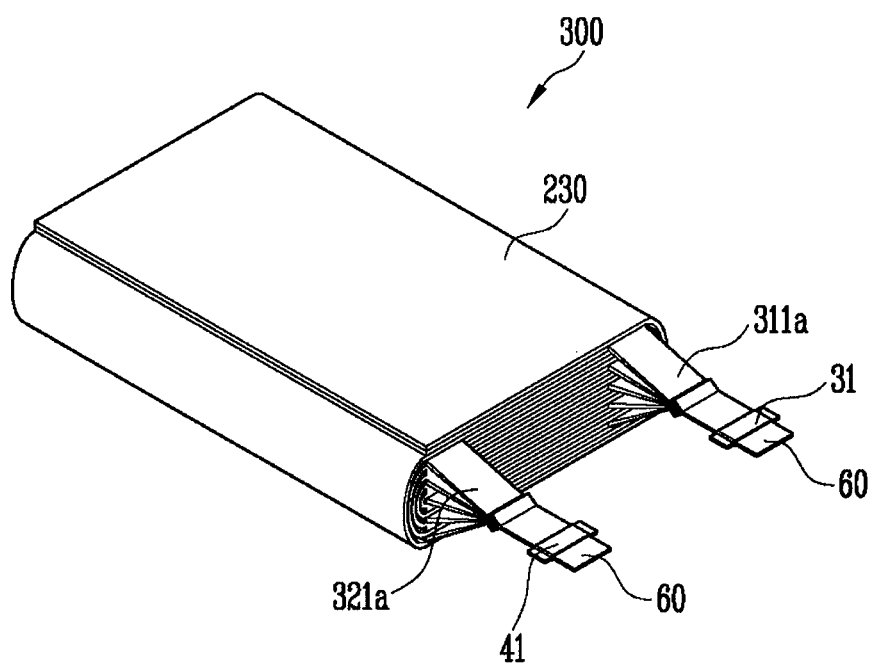
FIG. 5 is a perspective view of an electrode assembly according to still another embodiment.

FIG. 5 is a perspective view of an electrode assembly according to still another embodiment.

Referring to FIG. 5, the stacked-type electrode assembly 300 includes positive and negative electrode plates stacked each other and a separator 230 interposed between these electrode plates. In one embodiment, a first or second non-coating portion provided to the positive or negative plate is formed on at least one of upper and lower portions in the length direction of the positive or negative electrode plate. In this embodiment, at least portions of the first and second non-coating portions correspond to each other.

First and second tab portions 311a and 321a respectively provided to the first and second non-coating portions may be formed by punching the first and second non-coating portions using, for example, a mold or the like. The tab portions may be electrically connected to one another by a clamping member 60, C-shaped clip or the like. In this instance, the clamping member 60 may include a portion for fixing the tab portions and a portion extended therefrom.

The clamping member 60 fixes the first or second tab portions 311a and 321a, and may be protruded to the outside through a sealing portion of a battery case by the extended portion. Therefore, a separate electrode lead is not required. A lead film 31 or 41 may be further formed at the extended portion of the clamping member 60. The lead film 31 or 41 is provided at the extended portion of the clamping member 60, and may be provided at a portion that comes in contact with the sealing portion of the battery case. The lead films 31 and 41 can prevent a short circuit between the clamping member 60 and the sealing portion and prevent an electrolyte from being flowed out from the battery case.

According to at least one of the disclosed embodiments, it is possible to provide a secondary battery capable of being stably used at a high temperature and preventing a safety problem caused by the degradation of the secondary battery.

While the disclosed embodiments have been described in connection with the accompanying drawings, it is to be understood that they are not considered limiting, but, are intended to cover various modifications and equivalent arrangements included within the spirit and scope of the appended claims, and equivalents thereof.

What is claimed is:

1. A stacked-type electrode assembly comprising:
   at least one first electrode plate comprising i) a first base material, ii) a first active material coating portion formed on the first base material and coated with a first active material and iii) a first non-coated portion extending only from shorter sides of the first active material coating portion;
   at least one second electrode plate comprising i) a second base material, ii) a second active material coated portion formed on the second base material and coated with a second active material and iii) a second non-coated portion extending only from shorter sides of the second active material coating portion, wherein each of the first and second non-coated portions includes first and second surfaces opposing each other, wherein only the second surfaces respectively contact the first and second active material coating portions, wherein the first non-coated portion includes first and second ends respectively connecting the first and second surfaces of the first non-coated portion, and wherein the second non-coated portion includes first and second ends respectively connecting the first and second surfaces of the second non-coated portion;
   at least one separator interposed between the first and second electrode plates;
   a first tab portion including first and second sides opposing each other, wherein the first side of the first tab portion directly extends from the first end of the first non-coated portion; and
   a second tab portion including first and second sides opposing each other, wherein the second side of the second tab portion directly extends from the second end of the second non-coated portion.

2. The stacked-type electrode assembly according to claim 1, wherein the first non-coated portion is longer than the second non-coated portion.

3. The stacked-type electrode assembly according to claim 1, wherein the first and second electrode plates are positive and negative electrode plates, respectively.

4. The stacked-type electrode assembly according to claim 3, wherein the first and second active material coated portions are positive and negative electrode active material coated portions, respectively, and wherein the area of the negative electrode active material coated portion is greater than that of the positive electrode active material coated portion.

5. The stacked-type electrode assembly according to claim 3, wherein the areas of the positive and negative electrode plates are substantially the same.

6. The stacked-type electrode assembly according to claim 1, wherein the first and second non-coated portions respectively have substantially the same width as the first and second active material coated portions.

7. The stacked-type electrode assembly according to claim 6, wherein the length of the first or second non-coated portion defined in a first or second length direction is from about 2 mm to about 3 mm.

8. The stacked-type electrode assembly according to claim 1, wherein the first or second non-coated portion is formed at both the upper and lower portions of the first or second electrode plate.

9. The stacked-type electrode assembly according to claim 1, wherein the first tab portion comprises a plurality of first sub-tab portions which have the same polarity and are stacked to be substantially aligned with each other, wherein the second tab portion comprises a plurality of second sub-tab portions which have the same polarity and are stacked to be substantially aligned with each other, and wherein the polarity of the first sub-tab portions is different from that of the second sub-tab portions.

10. The stacked-type electrode assembly according to claim 9, wherein the first sub-tab portions do not contact the second sub-tab portions.

11. The stacked-type electrode assembly according to claim 1, wherein the first and second tab portions extend in the same direction from the electrode assembly.

12. The stacked-type electrode assembly according to claim 1, wherein the first and second tab portions are integrally formed with the first and second non-coated portions, respectively.

13. The stacked-type electrode assembly according to claim 1, wherein the first and second non-coated portions at least partially overlap with each other in a direction substantially perpendicular to i) one of first and second length directions in which the first and second non-coated portions extend and ii) one of first and second width directions crossing the first and second length directions.

14. The stacked-type electrode assembly according to claim 1, wherein at least part of the first non-coated portion is formed substantially directly above or below at least part of the second non-coated portion.

15. The stacked-type electrode assembly according to claim 1, wherein the first tab portion linearly extends from the first non-coated portion, and wherein the second tab portion linearly extends from the second non-coated portion.

16. A secondary battery comprising:
   a stacked-type electrode assembly comprising:
      at least one first electrode plate comprising i) a first base material, ii) a first active material coated portion formed on the first base material and coated with a first active material and iii) a first non-coated portion extending only from shorter sides of the first active material coated portion;
      at least one second electrode plate comprising i) a second base material, ii) a second active material coated portion formed on the second base material and coated with a second active material and iii) a second non-coated portion extending only from shorter sides of the second active material coated portion, wherein each of the first and second non-coated portions includes first and second surfaces opposing each other, wherein only the second surfaces respectively contact the first and second active material coating portions, wherein the first non-coated portion includes first and second ends respectively connecting the first and second surfaces of the first non-coated portion, and wherein the second non-coated portion includes first and second ends respectively connecting the first and second surfaces of the second non-coated portion;
      at least one separator interposed between the first and second electrode plates;
   a battery case that accommodates the electrode assembly;
      a first tab portion including first and second sides opposing each other, wherein the first side of the first tab portion directly extends from the first end of the first non-coated portion; and
      a second tab portion including first and second sides opposing each other, wherein the second side of the second tab portion directly extends from the second end of the second non-coated portion; and
   first and second electrode leads electrically connected to the electrode assembly and at least partially exposed from the battery case.

17. The secondary battery according to claim 16, wherein the at least one first electrode plate comprises a plurality of first electrode plates, wherein the at least one second electrode plate comprises a plurality of second electrode plates, wherein the first tab portion comprises a plurality of first tab portions, wherein the second tab portion comprises a plurality of second tab portions, and wherein the first tab portions or the second tab portions are electrically connected to each other via a clamping or C-shaped clip.

18. The stacked-type electrode assembly according to claim 16, wherein at least part of the first non-coated portion is formed substantially directly above or below at least part of the second non-coated portion.

19. A stacked-type electrode assembly comprising:
   at least one first electrode plate comprising i) a first coated portion coated with a first active material and ii) a first non-coated portion extending only from a first shorter side of the first coated portion and formed on one end of the first coated portion;
   at least one second electrode plate comprising i) a second coated portion coated with a second active material which is different from the first active material and ii) a second non-coated portion extending only from a second shorter side of the second coated portion and formed on one end of the second coated portion, wherein the first and second shorter sides do not overlap each other in a direction extending from one of the first and second electrode plates to the other electrode plate, wherein each of the first and second non-coated portions includes first and second surfaces opposing each other, wherein only the second surfaces respectively contact the first and second active material coating portions, wherein the first non-coated portion includes first and second ends respectively connecting the first and second surfaces of the first non-coated portion, and wherein the second non-coated portion includes first and second ends respectively connecting the first and second surfaces of the second non-coated portion;
   a first tab portion including first and second sides opposing each other, wherein the first side of the first tab portion directly extends from the first end of the first non-coated portion;
   a second tab portion including first and second sides opposing each other, wherein the second side of the second tab portion directly extends from the second end of the second non-coated portion; and
   at least one separator interposed between the respective first and second electrode plates.

20. The stacked-type electrode assembly according to claim 19,
   wherein the first electrode plate has a first width and a first length which is greater than the first width, and wherein the first electrode plate has upper and lower portions formed in the direction of the first length,
   wherein the second electrode plate has a second width and a second length which is greater than the second width, and wherein the second electrode plate has upper and lower portions formed in the direction of the second length,
   wherein the first non-coated portion is formed on at least one of the upper and lower portions of the first electrode plate, and wherein the second non-coated portion is formed on at least one of the upper and lower portions of the second electrode plate,
   and wherein the length of the first or second non-coated portion defined in the first or second length direction is from about 2 mm to about 3 mm.

* * * * *